(12) United States Patent
Carcano et al.

(10) Patent No.: US 12,532,389 B2
(45) Date of Patent: Jan. 20, 2026

(54) ELECTRICALLY INSULATED METAL RACK TO OPTIMIZE COOKING PERFORMANCE AND PREVENT ARCING

(71) Applicant: ILLINOIS TOOL WORKS INC., Glenview, IL (US)

(72) Inventors: Marco Carcano, Senago (IT); Michele Sclocchi, San Donato Milanese (IT); Andrea Baccara, Chicago, IL (US); Michele Gentile, Jesi (IT)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1583 days.

(21) Appl. No.: 16/778,067

(22) Filed: Jan. 31, 2020

(65) Prior Publication Data
US 2020/0253004 A1 Aug. 6, 2020

Related U.S. Application Data

(60) Provisional application No. 62/799,900, filed on Feb. 1, 2019.

(51) Int. Cl.
*H05B 6/64* (2006.01)
*F24C 15/16* (2006.01)
*H05B 6/68* (2006.01)

(52) U.S. Cl.
CPC .......... *H05B 6/6408* (2013.01); *F24C 15/16* (2013.01); *H05B 6/686* (2013.01)

(58) Field of Classification Search
CPC .... H05B 6/6408; H05B 6/686; H05B 6/6473; F24C 15/16; F24C 15/168; Y02B 40/00
See application file for complete search history.

(56) References Cited

U.S. PATENT DOCUMENTS 4,511,779 A * 4/1985 Bucksbaum ......... H05B 6/6402
219/732
2005/0051543 A1 3/2005 Isogai et al.
(Continued)

FOREIGN PATENT DOCUMENTS

DE 102013214852 A1 * 2/2015 .............. F24C 15/16
DE 102013214853 A1 2/2015
(Continued)

OTHER PUBLICATIONS

International Search Report and Written Opinion of International Application No. PCT/US2020/016156 mailed May 26, 2020, all enclosed pages cited.

*Primary Examiner* — Helena Kosanovic
*Assistant Examiner* — Thao Uyen Tran-Le
(74) *Attorney, Agent, or Firm* — Burr & Forman

(57) ABSTRACT

An oven may include a cooking chamber configured to receive a food product, at least a pair of rack supports disposed at opposing sidewalls of the cooking chamber, a rack configured to support the food product responsive to placement of the rack on the rack supports, a rack interface insulating assembly comprising insulating material providing a dielectric barrier between the rack and the rack supports, and a radio frequency (RF) heating system configured to provide RF energy into the cooking chamber using solid state electronic components to heat the food product. The solid state electronic components include power amplifier electronics and control electronics configured to control operation of the power amplifier electronics.

19 Claims, 12 Drawing Sheets

(56) References Cited

U.S. PATENT DOCUMENTS

| | | | | |
|---|---|---|---|---|
| 2013/0119053 A1* | 5/2013 | Linton | ............... | F24C 15/16 |
| | | | | 219/762 |
| 2013/0228568 A1* | 9/2013 | Huynh | .............. | H05B 6/763 |
| | | | | 219/774 |
| 2016/0014852 A1 | 1/2016 | Metz et al. | | |
| 2017/0071036 A1* | 3/2017 | Hunter, Jr. | ............ | H05B 6/686 |
| 2017/0146246 A1* | 5/2017 | Stewart | ............ | F24C 15/168 |
| 2018/0027614 A1* | 1/2018 | De Luca | ............ | H05B 6/6408 |
| | | | | 219/528 |
| 2018/0288835 A1* | 10/2018 | Celik | ............... | F24C 15/16 |

FOREIGN PATENT DOCUMENTS

| | | | |
|---|---|---|---|
| DE | 102017101166 A1 * | 7/2018 | |
| WO | 2016115215 A1 | 7/2016 | |

\* cited by examiner

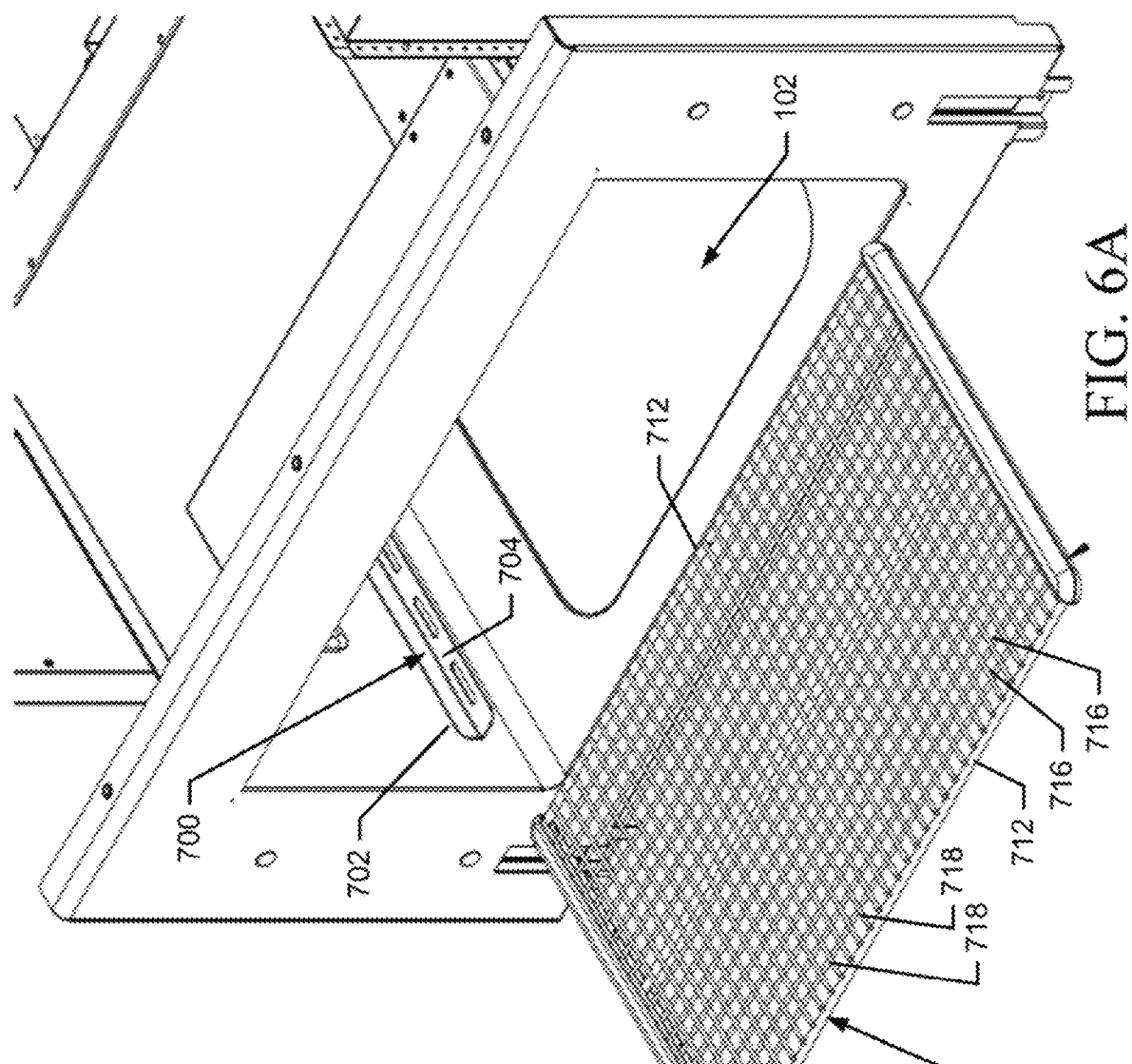
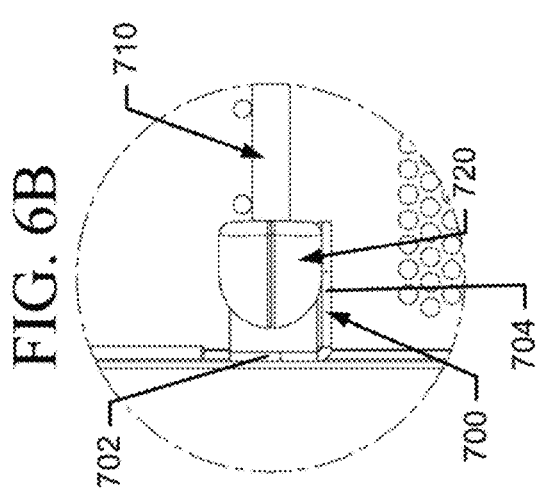
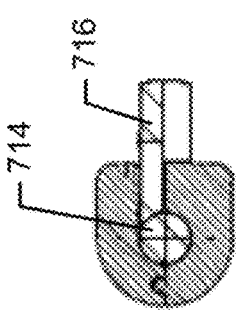
FIG. 6A
FIG. 6B
FIG. 6C

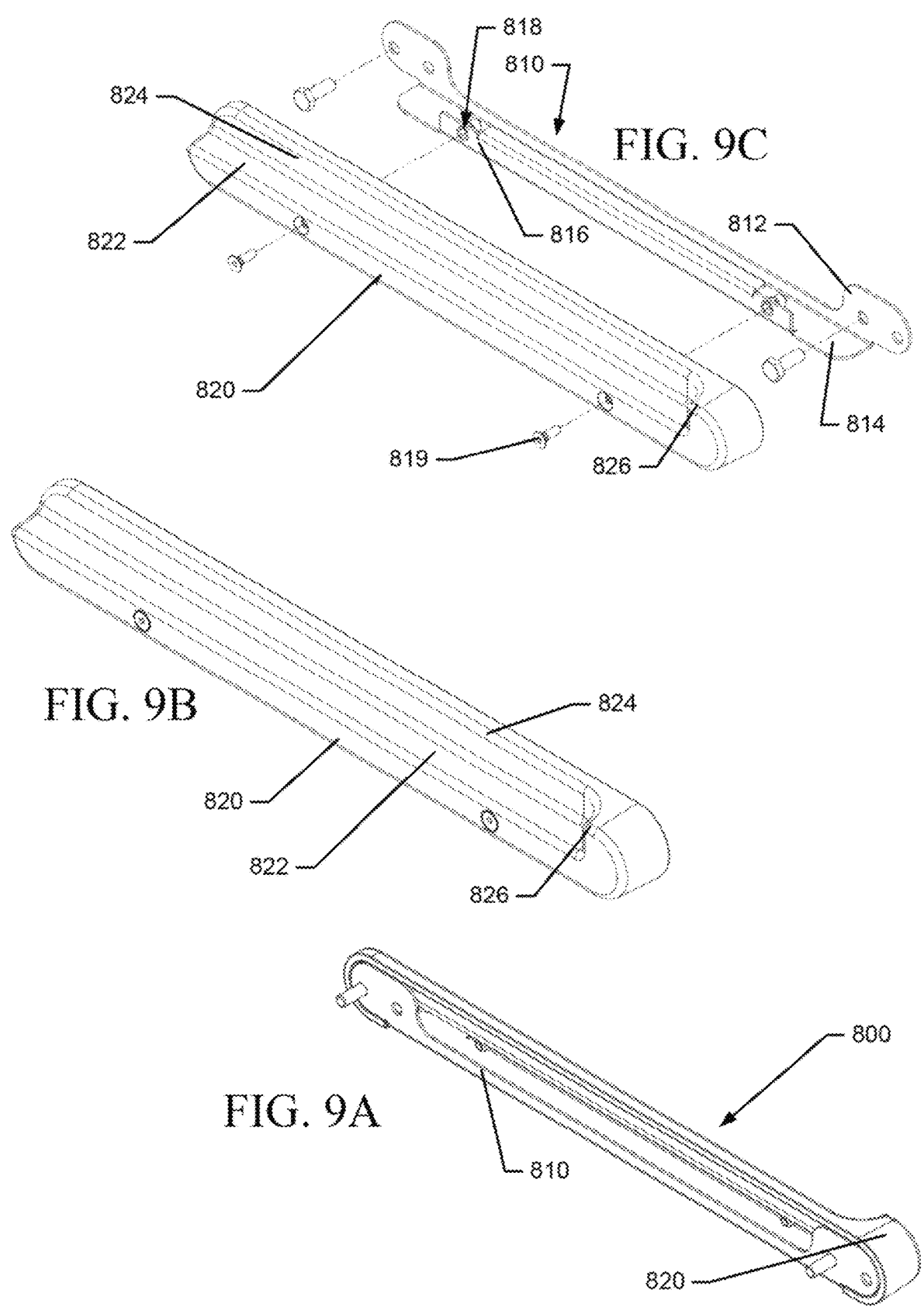

ELECTRICALLY INSULATED METAL RACK TO OPTIMIZE COOKING PERFORMANCE AND PREVENT ARCING

CROSS-REFERENCE TO RELATED APPLICATIONS

The present application claims priority to U.S. Provisional Application No. 62/799,900, filed on Feb. 1, 2019, the contents of which are hereby, incorporated herein by reference in its entirety.

TECHNICAL FIELD

Example embodiments generally relate to ovens and, more particularly, relate to an oven that uses radio frequency (RF) heating and an insulated metal rack that prevents arcing in the process of RF heating.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality. More recently, ovens with improved capabilities relative to cooking food with a combination of controllable RF energy and convection energy have been introduced. Unlike the relatively indiscriminate bombarding of food product, which generally occurs in microwave cooking, the use of controllable RF energy can enable a much more fine-tuned control of the cooking process. This fine-tuned control of the cooking process can lead to superior results in vastly shortened time periods.

The use of RF within an oven can cause arcing (i.e., electrical discharge) when a high intensity electric field is formed with sufficient energy to exceed the breakdown threshold of air. Arcing typically occurs in the vicinity of conductive materials (e.g., metallic objects), and more particularly often occurs at the edges of such materials. In this regard, for example, the edges of metallic objects may be susceptible to charge buildup when RF energy is applied, and the charge may buildup to the point of exceeding the breakdown threshold of air, as mentioned above.

For microwave ovens, the common approach to solving the issue of arcing, as it related to metallic objects, was mainly to make it well known that metallic objects should not be placed in the oven. However, for combination ovens, the fact that convection heating is also used, and metallic implements are advantageous in that context may provide motivation to improve the capacity of ovens for supporting the use of metallic implements and even cooking racks within the oven.

BRIEF SUMMARY OF SOME EXAMPLES

In an example embodiment, an oven is provided. The oven may include a cooking chamber configured to receive a food product, at least a pair of rack supports disposed at opposing sidewalls of the cooking chamber, a rack configured to support the food product responsive to placement of the rack on the rack supports, a rack interface insulating assembly comprising insulating material providing a dielectric barrier between the rack and the rack supports, and a radio frequency (RF) heating system configured to provide RF energy into the cooking chamber using solid state electronic components to heat the food product. The solid state electronic components may include power amplifier electronics and control electronics configured to control operation of the power amplifier electronics.

In another example embodiment, a rack insulator for an oven is provided. The rack insulator may include insulating material and may be configured to substantially enclose at least a portion of a wire frame or a rack of the oven that is proximate to a corresponding rack support that supports the rack in the oven responsive to insertion of the rack into the oven. The rack insulator may include a first body portion, and a second body portion. The first body portion may include a first frame reception slot that substantially mirrors a second frame reception slot formed in the second body portion, and each of the first and second reception slots may extend substantially parallel to a longitudinal length of the first and second body portions, respectively.

In another example embodiment, an insulated rack support for an oven is provided. The insulated rack support may include a rack support body that includes insulating material, and a metallic mounting bracket that mounts to a sidewall of the oven. The rack support body may be attachable to the mounting bracket, and the rack support body may include a sidewall spacer portion and an insulated support surface that extends away from the sidewall spacer portion to define a platform on which the rack is enabled to be supported or slid. The insulated support surface may terminate at a bumper portion formed at a distal end of the rack support body relative to a door of the oven. The bumper portion may be formed to include a shape configured to match a curvature of a corner portion of the rack.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
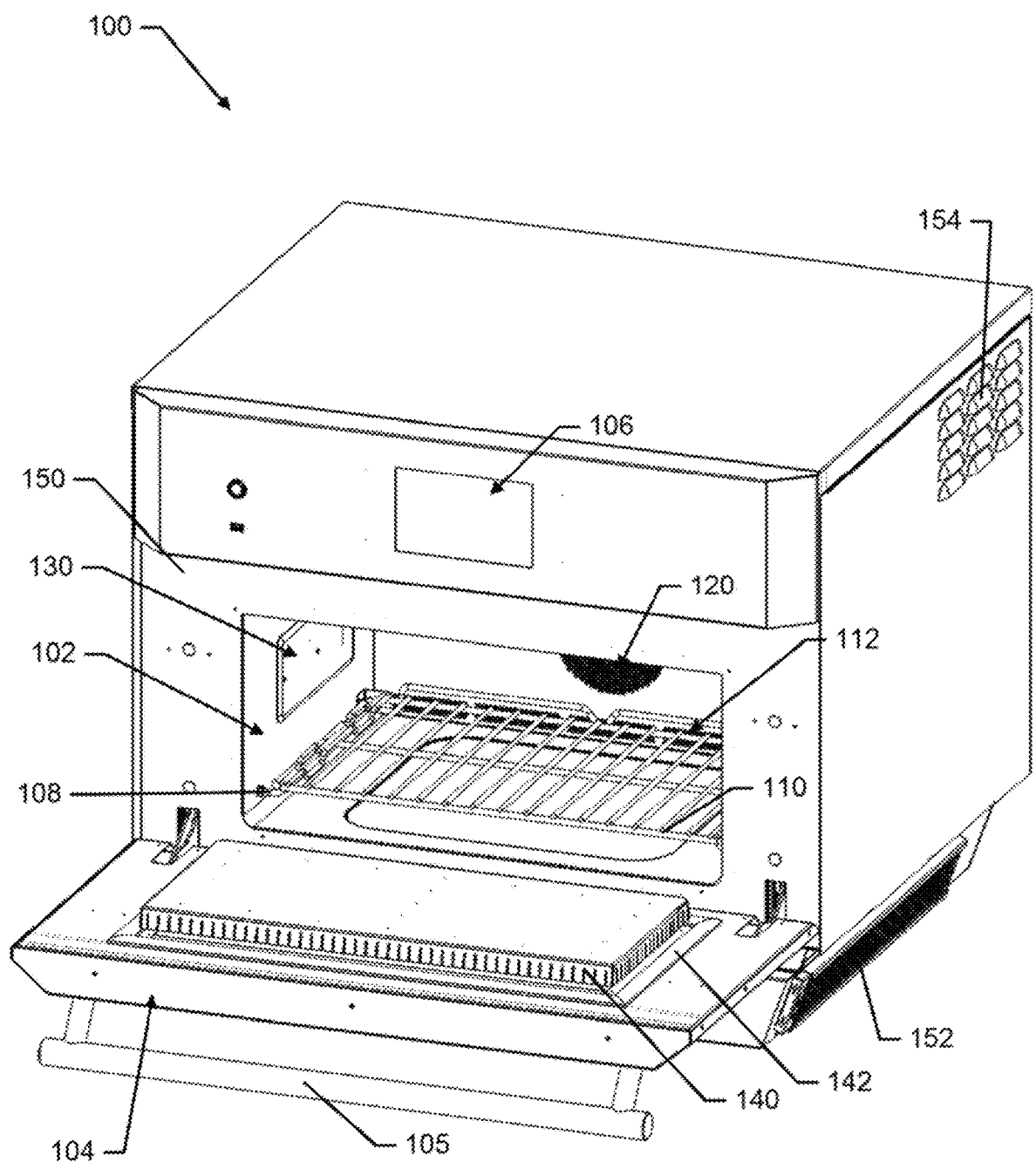
FIG. 1 illustrates a perspective view of an oven capable of employing at least two energy sources according to an example embodiment.

FIG. 6, which is defined by FIGS. 6A, 6B and 6C, shows portions of a rack interface insulating assembly of an example embodiment;

FIG. 7, which is defined by FIGS. 7A, 7B, 7C, 7D, 7E and 7F, shows various aspects of a two piece structure of a rack insulator in accordance with an example embodiment;

FIG. 8 which is defined by FIGS. 8A, 8B, 8C and 8D illustrates various views of an insulated rack support located within the oven in accordance with an example embodiment; and FIG. 9, which is defined by FIGS. 9A, 9B and 9C shows various views of the insulated rack support in isolation in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the cooking performance of an oven and/or may improve the operator experience of individuals employing an example embodiment. In this regard, the oven may cook food relatively quickly and uniformly, based on the application of RF energy under the instruction of solid state power amplification and control electronics that are configured to achieve optimal cooking results in terms of efficiency and/or uniformity. The efficiency improvement may be achieved by the effective delivery of power to the load, resulting in faster cooking, and the uniformity may be noticed by more even heating over the entire portion of the food that is treated by the oven. However, the use of RF energy as described above and the protective strategies and structures that are described herein may further improve the overall performance of the oven by preventing arcing.

In this regard, example embodiments employ power amplifier electronics components that can be controlled so that cooking parameters can be efficiently and uniformly managed. Electronics within the system can also employ system protection functions to prevent damage to the electronics of the oven. Meanwhile, the target of the system is typically a food product placed inside the cooking chamber or cavity of the oven. That food product is typically supported (either directly or indirectly) by a rack (e.g., a mechanical, planar structure designed to support the food product (or a container/pan supporting the food product) at the proper height within the cooking chamber). The rack is traditionally a metal structure, and is often formed as a mesh of metallic wires or rods. The rack is often also supported within the oven by metallic structures that allow placement or sliding of the rack within the cooking chamber at a selected height.

In a convection oven, the rack is a ubiquitous feature that offers very little (if any) downside to its use. However, when microwave energy is applied to a cooking chamber, the use of a metallic rack can create problems with arcing, as mentioned above. In this regard, microwave energy distribution into the cooking chamber may be very sensitive to the presence of metallic parts. The occurrence of arcing, particularly between poorly insulated metal parts, could lead to damage to the microwave source and/or damage to the metallic parts themselves or to the cooking chamber structures. To the extent that arcing occurs, even if such arcing can be detected and responded to protect electronic components, such protection would typically decrease cooking efficiency since it would require at least a momentary reduction of energy application.

Accordingly, example embodiments provide structures that can effectively insulate metallic components within the cooking chamber. In this regard, for example, some embodiments may provide a structure that effectively insulates a metallic oven rack so that the metallic oven rack can be used in connection with RF cooking with significantly reduced likelihood of arcing. By using an example embodiment, the advantages of using a metallic oven rack that are experienced in connection with conventional ovens that employ convection cooking can be retained in an oven that also uses microwave or other RF energy to facilitate faster and more efficient cooking without facing the disadvantages that are otherwise commonly expected in connection with using metallic parts in an oven that cooks with RF. Some example structures describing these solutions will be discussed below in reference to FIGS. 6-9. However, first a further description of the environmental context in which this problem arose will be discussed in reference to FIGS. 1-5.

FIG. 1 illustrates a perspective view of an oven 100 according to an example embodiment. As shown in FIG. 1, the oven 100 may include a cooking chamber 102 into which a food product may be placed for the application of heat by any of at least two energy sources that may be employed by the oven 100. The cooking chamber 102 may include a door 104 and an interface panel 106, which may sit proximate to the door 104 when the door 104 is closed. The door 104 may be operable via handle 105, which may extend across the front of the oven 100 parallel to the ground. In some cases, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a back or rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100.

In an example embodiment, food product placed on a pan or one of the racks 110 (or simply on a base of the cooking chamber 102 in embodiments where racks 110 are not employed) may be heated at least partially using radio frequency (RF) energy. Meanwhile, the airflow that may be provided may be heated to enable further heating or even browning to be accomplished. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

In an example embodiment, a gasket 142 may be provided to extend around the periphery of the choke 140. In this regard, the gasket 142 may be formed from a material such as wire mesh, rubber, silicon, or other such materials that may be somewhat compressible between the door 104 and a periphery of the opening into the cooking chamber 102. The gasket 142 may, in some cases, provide a substantially air tight seal. However, in other cases (e.g., where the wire mesh is employed), the gasket 142 may allow air to pass therethrough. Particularly in cases where the gasket 142 is substantially air tight, it may be desirable to provide an air cleaning system in connection with the first air circulation system described above.

The antenna assembly 130 may be configured to generate controllable RF emissions into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a substantially hollow cavity within the oven body 150 that is disposed below the cooking chamber 102. The inlet array 152 may include multiple inlet ports that are disposed on each opposing side of the oven body 150 (e.g., right and left sides when viewing the oven 100 from the front) proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. Furthermore, the inlet array 152 is at least partially shielded from any direct communication path from the outlet louvers 154 by virtue of the fact that, at the oven sides (which include both portions of the inlet array 152 and outlet louvers 154), the shape of the basement is such that the tapering of the inlet array 152 is provided on walls that are also slightly inset to create an overhang 158 that blocks any air path between inlet and outlet. As such, air drawn into the inlet array 152 can reliably be expected to be air at ambient room temperature, and not recycled, expelled cooling air.

Figure 2:
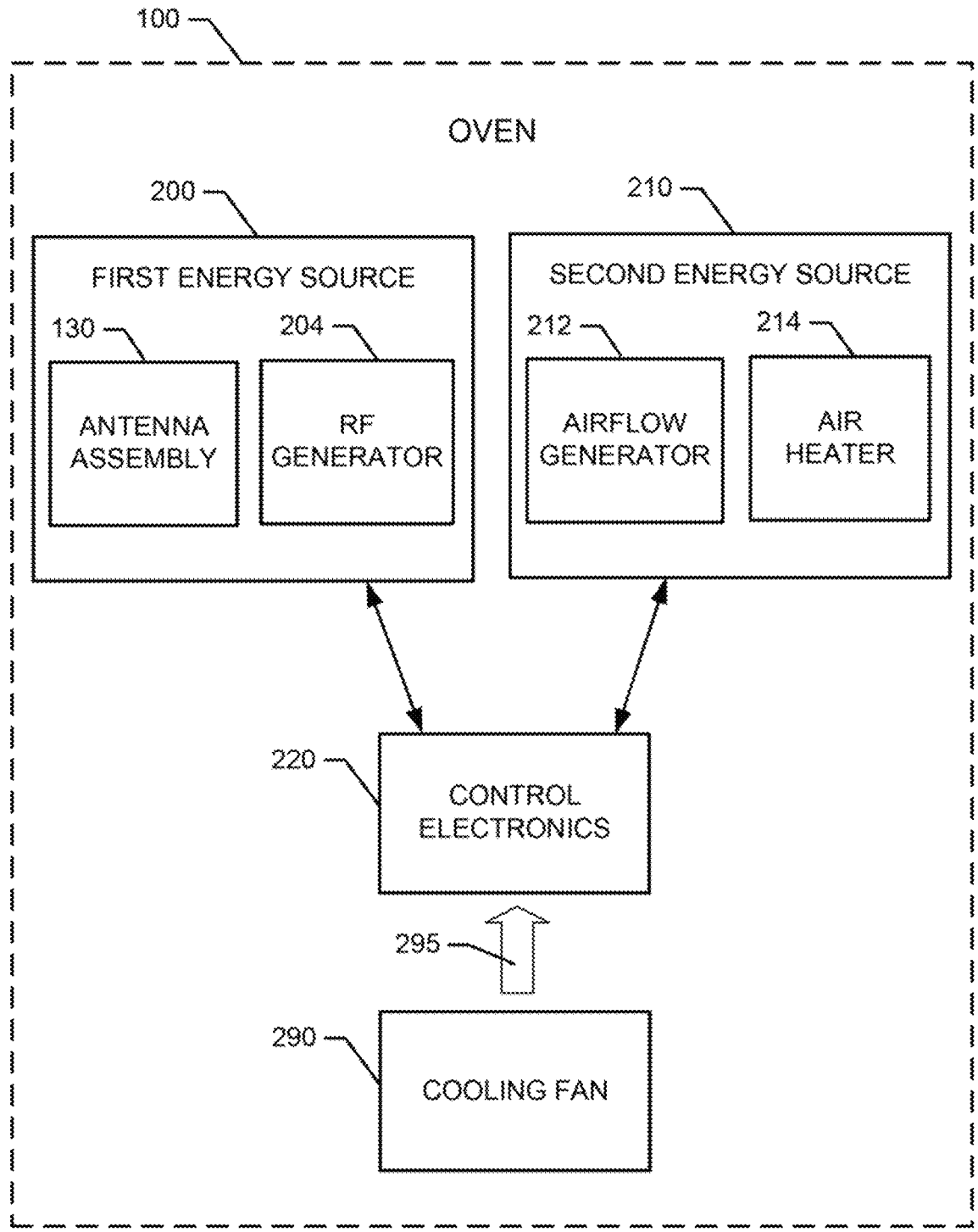
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments. Moreover, some example embodiments could be practiced in the context of an oven that includes only a single energy source (e.g., the second energy source 210). As such, example embodiments could be practiced on otherwise conventional ovens that apply heat using, for example, gas or electric power for heating.

As mentioned above, the first energy source 200 may be an RF energy source (or RF heating source) configured to generate relatively broad spectrum RF energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from unlicensed frequency (e.g., the ISM) bands for application by the RF generator 204.

In some cases, the antenna assembly 130 may be configured to transmit the RF energy into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking signatures, programs or recipes may be provided to define the cooking parameters to be employed for each of multiple potential cooking stages or steps that may be defined for the food product and the control electronics 220 may be configured to access and/or execute the cooking signatures, programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking signatures, programs or recipes.

As discussed above, the first air circulation system may be configured to drive heated air through the cooking chamber 102 to maintain a steady cooking temperature within the cooking chamber 102. Meanwhile, the second air circulation system may cool the control electronics 220. The first and second air circulation systems may be isolated from each other. However, each respective system generally uses differential pressures (e.g., created by fans) within various compartments formed in the respective systems to drive the corresponding air flows needed for each system. While the airflow of the first air circulation system is aimed at heating food in the cooking chamber 102, the airflow of the second air circulation system is aimed at cooling the control electronics 220. As such, cooling fan 290 provides cooling air 295 to the control electronics 220, as shown in FIG. 2.

The structures that form the air cooling pathways via which the cooling fan 290 cools the control electronics 220 may be designed to provide efficient delivery of the cooling air 295 to the control electronics 220, but also minimize fouling issues or dust/debris buildup in sensitive areas of the oven 100, or areas that are difficult to access and/or clean. Meanwhile, the structures that form the air cooling pathways may also be designed to maximize the ability to access and clean the areas that are more susceptible to dust/debris buildup. Furthermore, the structures that form the air cooling pathways via which the cooling fan 290 cools the control electronics 220 may be designed to strategically employ various natural phenomena to further facilitate efficient and effective operation of the second air circulation system. In this regard, for example, the tendency of hot air to rise, and the management of high pressure and low pressure zones necessarily created by the operation of fans within the system may each be employed strategically by the design and placement of various structures to keep certain areas that are hard to access relatively clean and other areas that are otherwise relatively easy to access more likely to be places where cleaning is needed.

Figure 3:
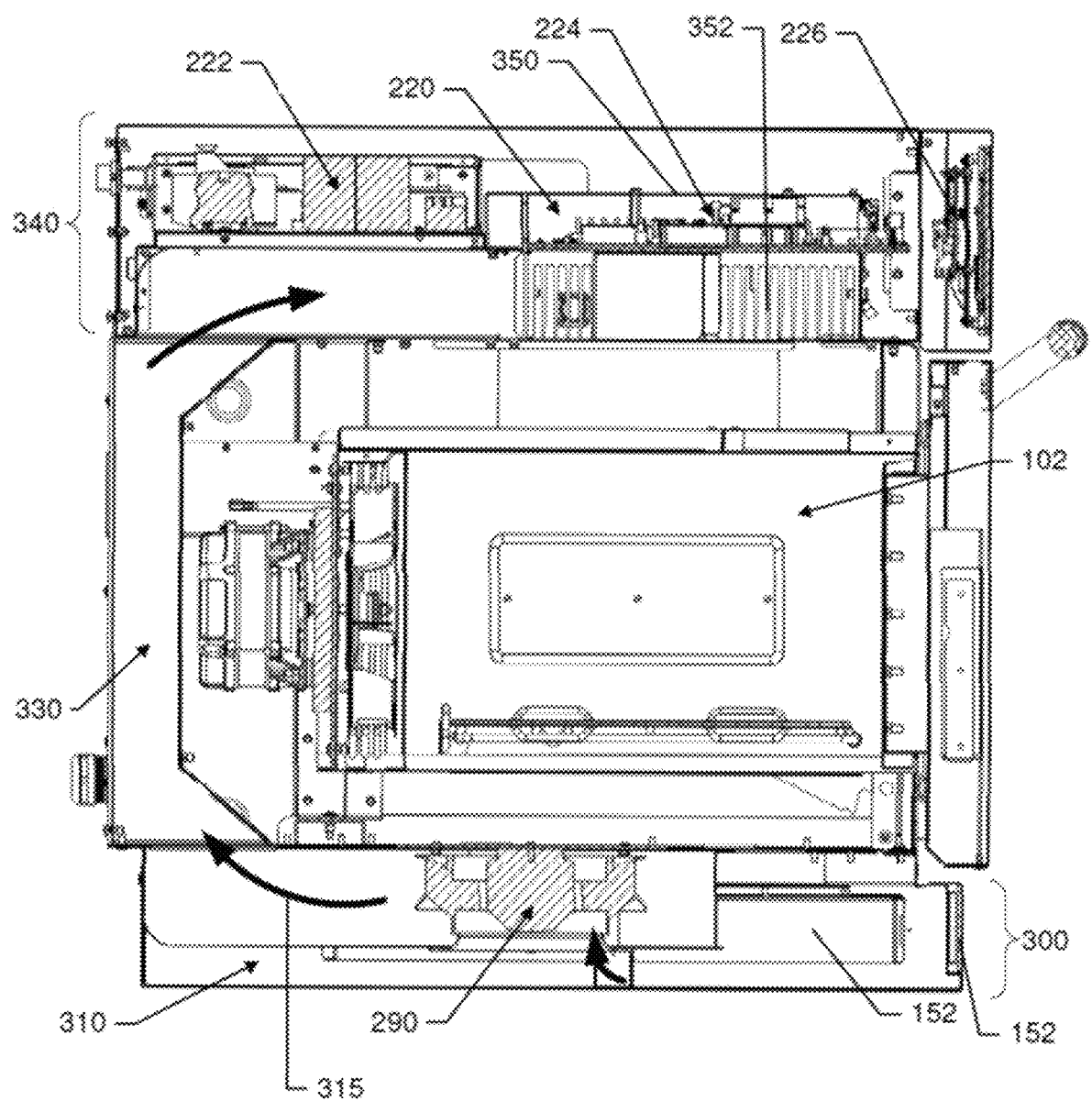
FIG. 3 shows a cross sectional view of the oven from a plane passing from the front to the back of the oven according to an example embodiment.

The typical airflow path, and various structures of the second air circulation system, can be seen in FIG. 3. In this regard, FIG. 3 shows a cross sectional view of the oven 100 from a plane passing from the front to the back of the oven 100. The basement (or basement region 300) of the oven 100 is defined below the cooking chamber 102, and includes an inlet cavity 310. During operation, air is drawn into the inlet cavity 310 through the inlet array 152 and is further drawn into the cooling fan 290 before being forced radially outward (as shown by arrow 315) away from the cooling fan 290 into a riser duct 330 (e.g., a chimney) that extends from the basement region 300 to the attic (or attic region 340) to turn air upward (as shown by arrow 315). Air is forced upward through the riser duct 330 into the attic region 340, which is where components of the control electronics 220 are disposed. The air then cools the components of the control electronics 220 before exiting the body 150 of the oven 100 via the outlet louvers 154. The components of the control electronics 220 may include power supply electronics 222, power amplifier electronics 224 and display electronics 226.

Upon arrival of air into the attic region 340, the air is initially guided from the riser duct 330 to a power amplifier casing 350. The power amplifier casing 350 may house the power amplifier electronics 224. In particular, the power amplifier electronics 224 may sit on an electronic board to which all such components are mounted. The power amplifier electronics 224 may therefore include one or more power amplifiers that are mounted to the electronic board for powering the antenna assembly 130. Thus, the power amplifier electronics 224 may generate a relatively large heat load. To facilitate dissipation of this relatively large heat load, the power amplifier electronics 224 may be mounted to one or more heat sinks 352. In other words, the electronic board may be mounted to the one or more heat sinks 352. The heat sinks 352 may include large metallic fins that extend away from the circuit board to which the power amplifier electronics 224 are mounted. Thus, the fins may extend downwardly (toward the cooking chamber 102). The fins may also extend in a transverse direction away from a centerline (from front to back) of the oven 100 to guide air provided into the power amplifier casing 350 and past the fins of the heat sinks 352.

Figure 4:
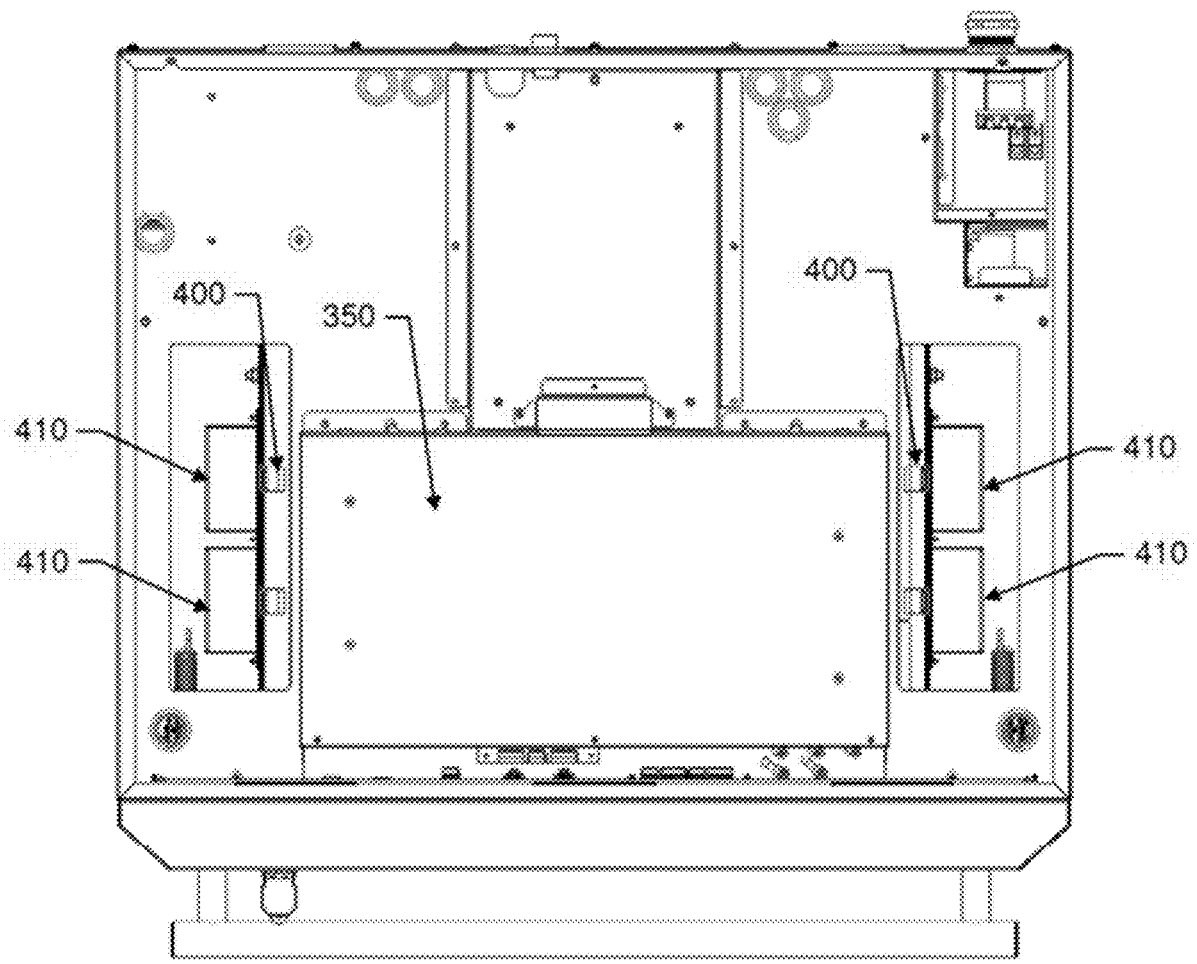
FIG. 4 is a top view of an attic region of the oven in accordance with an example embodiment.

FIG. 4 illustrates a top view of the attic region 340, and shows the power amplifier casing 350 and various components of the antenna assembly 130 including a launcher assembly 400 and waveguides of a waveguide assembly 410. Power is provided from the power amplifier electronics 224 to each launcher of the launcher assembly 400. The launcher assembly 400 operably couples a signal generated by the power amplifiers of the power amplifier electronics 224 into a corresponding one of the waveguides of the waveguide assembly 410 for communication of the corresponding signal into the cooking chamber 102 via the antenna assembly 130 as described above.

The power amplifier electronics 224 are defined by a plurality of electronic circuitry components including opamps, transistors and/or the like that are configured to generate waveforms at the corresponding power levels, frequencies and phases that are desired for a particular situation or cooking program. In some cases, the cooking program may select an algorithm for control of the power amplifier electronics 224 to direct RF emissions into the cooking chamber 102 at selected power levels, frequencies and phases. One or more learning processes may be initiated to select one or more corresponding algorithms to guide the power application. The learning processes may include detection of feedback on the efficacy of the application of power at specific frequencies (and/or phases) into the cooking chamber 102. In order to determine the efficacy, in some cases, the learning processes may measure efficiency and compare the efficiency to one or more thresholds. Efficiency may be calculated as the difference between forward power ($P_{fwd}$) and reflected power ($P_{refl}$), divided by the forward power ($P_{fwd}$). As such, for example, the power inserted into the cooking chamber 102 (i.e., the forward power) may be measured along with the reflected power to determine the amount of power that has been absorbed in the food product (or workload) inserted in the cooking chamber 102. The efficiency may then be calculated as: Efficiency (eff)=($P_{fwd}$−$P_{refl}$)/$P_{fwd}$.

As can be appreciated from the description above, the measurement of the efficiency of the delivery of RF energy to the food product may be useful in determining how effective a particular (e.g., a current) selection for a combination (or pair) of frequency and phase parameters of RF energy applied into the cooking chamber 102 is at delivering heat energy to the food product. Thus, the measurement of efficiency may be useful for selecting the best combination or algorithm for application of energy. The measurement of efficiency should therefore also desirably be as accurate as possible in order to ensure that meaningful control is affected by monitoring efficiency.

Figure 5:
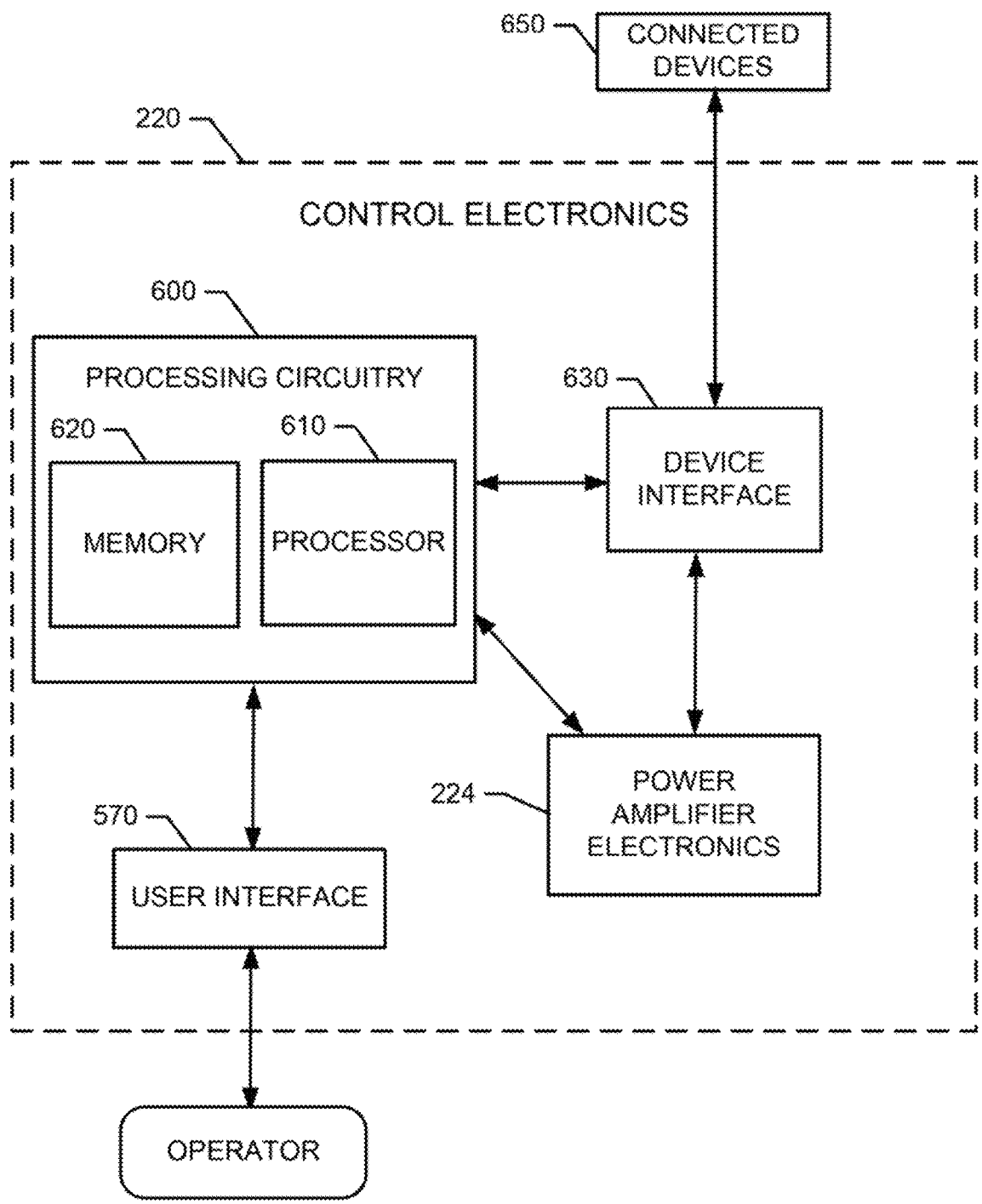
FIG. 5 is a block diagram of control electronics for providing the electronic circuitry for controlling RF application in the oven in accordance with an example embodiment.

FIG. 5 is a block diagram of control electronics 220 for providing the electronic circuitry for instantiation of power cycling during oven operation in accordance with an example embodiment. In some embodiments, the control electronics 220 may include or otherwise be in communication with processing circuitry 600 that is configurable to perform actions in accordance with example embodiments described herein. As such, for example, the functions attributable to the control electronics 220 may be carried out by the processing circuitry 600.

The processing circuitry 600 may be configured to perform data processing, control function execution and/or other processing and management services according to an example embodiment of the present invention. In some embodiments, the processing circuitry 600 may be embodied as a chip or chip set. In other words, the processing circuitry 600 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 600 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 600 may include one or more instances of each of a processor 610 and memory 620 that may be in communication with or otherwise control a device interface 630 and the user interface 570. As such, the processing circuitry 600 may be embodied as a circuit chip (e.g., an integrated circuit chip) configured (e.g., with hardware, software or a combination of hardware and software) to perform operations described herein. However, in some embodiments, the processing circuitry 600 may be embodied as a portion of an on-board computer.

The user interface 570 (which may be embodied as, include, or be a portion of the interface panel 106) may be in communication with the processing circuitry 600 to receive an indication of a user input at the user interface 570 and/or to provide an audible, visual, mechanical or other output to the user (or operator). As such, the user interface 570 may include, for example, a display (e.g., a touch screen such as the interface panel 106), one or more hard or soft buttons or keys, and/or other input/output mechanisms.

The device interface 630 may include one or more interface mechanisms for enabling communication with connected devices 650 such as, for example, other components of the oven 100, sensors of a sensor network of the oven 100, removable memory devices, wireless or wired network communication devices, and/or the like. In some cases, the device interface 630 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 630 may receive input at least from a temperature sensor that measures the temperatures described above, or receives input from any of the other parameters described above, in order to enable communication of such parameters to the processing circuitry 600 for the performance of certain protective or control functions. Alternatively or additionally, the device interface 630 may provide interface mechanisms for any devices capable of wired or wireless communication with the processing circuitry 600. In still other alternatives, the device interface 630 may provide connections and/or interface mechanisms to enable the processing circuitry 600 to control the various components of the oven 100.

In an exemplary embodiment, the memory 620 may include one or more non-transitory memory devices such as, for example, volatile and/or non-volatile memory that may be either fixed or removable. The memory 620 may be configured to store information, data, cooking signatures, programs, recipes, applications, instructions or the like for enabling the control electronics 220 to carry out various functions in accordance with example embodiments of the present invention. For example, the memory 620 could be configured to buffer input data for processing by the processor 610. Additionally or alternatively, the memory 620 could be configured to store instructions for execution by the processor 610. As yet another alternative, the memory 620 may include one or more databases that may store a variety of data sets responsive to input from the sensor network, or responsive to programming of any of various cooking programs. Among the contents of the memory 620, applications may be stored for execution by the processor 610 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 610 and stored in memory 620 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results. In still other examples, data tables may be stored to define calibration values and/or diagnostic values, as described above. Alternatively or additionally, the memory 620 may store applications for defining responses to stimuli including the generation of protective actions and/or notification functions. In some example embodiments, the memory 620 may store power envelope control and/or temperature envelope control algorithms as described in greater detail below.

The processor 610 may be embodied in a number of different ways. For example, the processor 610 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 610 may be configured to execute instructions stored in the memory 620 or otherwise accessible to the processor 610. As such, whether configured by hardware or by a combination of hardware and software, the processor 610 may represent an entity (e.g., physically embodied in circuitry—such as in the form of processing circuitry 600) capable of performing operations according to example embodiments of the present invention while configured accordingly. Thus, for example, when any instance of the processor 610 is embodied as an ASIC, FPGA or the like, the processor 610 may be specifically configured hardware for conducting the operations described herein. Alternatively, as another example, when the processor 610 is embodied as one or more executors of software instructions, the instructions may specifically configure the processor 610 to perform the operations described herein.

In an example embodiment, the processor 610 (or the processing circuitry 600) may be embodied as, include or otherwise control the control electronics 220 and/or the power amplifier electronics 224. As such, in some embodiments, the processor 610 (or the processing circuitry 600) may be said to cause each of the operations described in connection with the control electronics 220 and/or the power amplifier electronics 224 by directing the control electronics 220 and/or the power amplifier electronics 224, respectively, to undertake the corresponding functionalities responsive to execution of instructions or algorithms configuring the processor 610 (or processing circuitry 600) accordingly. As an example, the control electronics 220 may be configured to control the responses to various stimuli associated with executing the learning procedure discussed above and directing RF application within the oven 100 based on the learning procedure. Moreover, the control electronics 220 may be configured to determine efficiency parameters and take protective actions based on the efficiency parameters, or based on individual ones of the values, measurements and/or parameters that are determined by or received at the control electronics 220 for execution of the learning procedure. In some cases, a separate instance of a processor (or processors) and memory may be associated with different parts of the control electronics 220 (e.g., including separate processors for the control of the power amplifier electronics 224 amongst potentially others).

In an example embodiment, the control electronics 220 may also access and/or execute instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s) disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process, and may also perform protective functions. Finally, the control electronics 220 may execute instructions for calibration and/or fault analysis. Accordingly, for example, the control electronics 220 may be configured to act locally to protect the power amplifier electronics 224 via stopping RF application to the cooking chamber 102, via making adjustments to components to provide calibrated outputs, and/or via alerting the user when various abnormal or correctable situations are detected.

In some embodiments, efficiency calculations may be made periodically throughout the cooking process as part of a learning process. In this regard, the control electronics 220 may be configured to extrapolate, calculate or otherwise determine the amount of energy to be directed into food product (i.e., a forward power value), and the amount of energy reflected back from the cooking chamber 102 (i.e., a reflected power value) so that an accurate estimate of the absorbed power (or energy) can be estimated, and the efficiency parameter can be determined. The control electronics 220 may then control operation of the RF generator 204 and/or the antenna assembly 130 based on the measured efficiency as part of a calibration or cooking process. Thus, for example, if a learning process is performed during cooking, the measured efficiency may be expected to be at least above a threshold value (e.g., 40%) whenever there is a food product or load in the cooking chamber 102. If efficiency is below the threshold value, the control electronics 220 may communicate with the user interface 570 to let the user know to check the cooking chamber 102 to make sure that there is a load therein. Discrete efficiency measurements may be made at any desirable interval (e.g., every 100 msec) to perform the protective or alert functions described herein. If reflected power is very high, the power amplifier electronics 224 may be shutdown. If certain temperatures of components (e.g., one or both of the heat sinks 352, the processor 610, or air temperatures) are too high, an alarm may be provided through the user interface 570 and/or the power amplifier electronics 224 may be shutdown. Other protective actions are also possible.

As noted above, other protective functions could also be performed. For example, arcing detection could be employed and electronic protective functions could be employed when such arcing is detected. In this regard, protective functions may detect buildup of energy before the thresholds necessary for arcing can be reached. This can avoid damage to solid state control electronics by implementing real time system protection. Specifically, fast and temporary interruption of energy transmission until a new emission configuration that does not generate arcing can be implemented may dramatically improve reliability and fault protection. However, although this protective function is helpful in terms of component protection, this protective function will reduce average system efficiency. Thus, in order to maintain the best possible efficiency of cooking, example embodiments will provide structures for significantly reducing the risk of arcing within the oven 100 to further reduce the likelihood of needing to use the electronic protective functions described above. In particular, since it is desirable for the rack 110 and/or the rack supports 108 to be metallic components for cost and functionality purposes, then it should be appreciated that any areas where uneven or non-continuous contact between the rack supports 108 and the rack 110 occur will be prone to arcing. To prevent such arcing, example embodiments provide structures for ensuring that there is no such incidence of uneven or non-continuous contact.

In particular, some example embodiments may provide for the inclusion of a rack interface insulating assembly that places electrical insulating material between the rack 110 and rack supports 108 to develop a dielectric barrier between the adjacent metallic structures of the rack 110 and the rack supports 108. As will be discussed below, the insulating material may be placed on either or both of the rack 110 or the rack supports 108, and various examples will be described below.

FIG. 6, which is defined by FIGS. 6A, 6B and 6C, shows portions of a rack interface insulating assembly of an example embodiment. In this regard, FIG. 6A illustrates a perspective view of the cooking chamber 102 of FIG. 1 with rack supports 108 and rack 110 replaced by structures of an example embodiment. FIG. 6B illustrates a side view of an isolated portion of the interface between rack support 700 and a rack 710, and FIG. 6C illustrates a cross section view of the rack interface insulating assembly of an example embodiment. In this regard, rack supports 700 and rack 710 may be similar in form and/or function to those described in connection with the example of FIG. 1. However, the rack supports 700 and rack 710 of FIG. 6 employ the rack interface insulating assembly of one example embodiment.

In this example, the rack interface insulating assembly is embodied as a rack insulator 720. The rack insulator 720 is formed over opposing lateral ends of the rack 710 that would otherwise contact the rack support 700 on its respective side. As shown in FIGS. 6A and 6B, the rack support 700 may be a relatively simple metallic structure formed as a bracket having an L-shaped cross section. One portion (i.e., an oven interface portion 702) of the L-shaped structure used to form the rack support 700 may be affixed to a sidewall of the cooking chamber 102. The other portion of the L-shaped structure used to form the rack support 700 (i.e., the cantilevered portion 704) may be extended into the cooking chamber 102 substantially parallel to a plane of the bottom and/or top surface of the cooking chamber 102. The rack 710 may be supported by the cantilevered portion 704 of one instance of the rack support 700 provided at each respective lateral end of the rack 710 at a consistent height within the cooking chamber 102. Thus, it should be understood that any number of pairs of rack supports 700 could be placed in the cooking chamber 102 at respective different heights within the cooking chamber 102 to define different rack heights. Although FIG. 6 only shows one rack 710 and one height at which the rack 710 can be supported (and therefore only one pair of rack supports 700 would be necessary), it should be appreciated that other pairs of rack supports 700 could be included at respective different heights within the cooking chamber 102.

The rack 710 is defined by a metallic mesh of wires or rods that extend substantially perpendicular to each other in longitudinal and transverse directions. In this example, a frame may be defined to include longitudinal frame members 712 that define opposing longitudinally extending lateral edges of the rack 710, and transverse frame members 714 that define opposing transversely extending lateral edges of the rack 710. Longitudinal mesh rods 716 may be spaced apart from each other (e.g., by a distance of about 1.5 cm) and run parallel to each other between the longitudinal frame members 712 and transverse mesh rods 718 may be spaced apart from each other by the same distance that separates longitudinal mesh rods 716, and may extend parallel to each other between the transverse frame members 714.

As can be appreciated from FIG. 6, the cantilevered portion 704 of each instance of the rack support 700 (and each pair of instances of the rack supports 700) may be at a single and common height within the cooking chamber 102. Thus, the cantilevered portions 704 of any given pair of rack supports 700 would all lie in substantially the same plane for this example. The oven interface portion 702 and the cantilevered portion 704 may each be metallic and (for this example) need not necessarily have any insulating material applied thereto. In some examples, the oven interface portion 702 and the cantilevered portion 704 may each have approximately the same transverse and longitudinal lengths. However, different lengths could also be employed. In an example embodiment, the longitudinal lengths of each of the oven interface portion 702 and the cantilevered portion 704 may be about the same as the transverse length of each respective end of the rack 710. For example, if the rack 710 is defined as a wire mesh having a transverse length of about 32.5 cm and a longitudinal length of about 55 cm, then the longitudinal lengths of the oven interface portion 702 and the cantilevered portion 704 may each be about 32.5 cm. However, in some cases the longitudinal lengths of the oven interface portion 702 and the cantilevered portion 704 could be at least 80% of the transverse length of the rack 710 to provide suitable support for the rack 710. Alternatively, the longitudinal lengths of the oven interface portion 702 and the cantilevered portion 704 could be longer than the transverse length of the rack 710. In some cases, the transverse lengths of each of the oven interface portion 702 and the cantilevered portion 704 may fall in a range of about 1 cm to about 3 cm. In this example, the transverse lengths of the oven interface portion 702 and the cantilevered portion 704 are about 1.5 cm and about 2 cm, respectively.

In order to provide adequate insulation between metallic components of the rack 710 and the rack support 700, the rack insulator 720 may be formed to be positioned between any metallic part of the rack 710 and the rack support 700 that would otherwise have potential for contact upon insertion of the rack 710 into the cooking chamber 102. Thus, for example, the rack insulator 720 may be formed to cover the transverse frame members 714, and longitudinal end portions of each of the longitudinal mesh rods 716.

In an example embodiment, the rack insulator 720 may be formed of material that has good dielectric properties, and maintains such properties at high temperatures. Thus, for example, the rack insulator 720 may be formed of a dielectric material that does not suffer any degradation at temperatures up to about 275° C. In an example embodiment, the rack insulator 720 may be formed of Polyether ether ketone (PEEK). The thickness of the rack insulator 720 may be chosen based on consideration of both mechanical and electrical performance. In this regard, the thickness of the rack insulator 720 should be sufficient to prevent arcing with the power levels and frequencies employed, and must also be thick enough to provide sufficient robustness to withstand the mechanical stresses associated with sliding the rack 710 into the cooking chamber 102 repeatedly and placing potentially heavy food products onto the rack 710 with the corresponding mechanical shocks associated therewith.

In the pictured example, ensuring a thickness of about 0.5 cm for the PEEK used to form the rack insulator 720 has been shown to provide sufficient robustness in terms of mechanical properties, and is more than adequate to provide proper dielectric strength, as the mechanical properties were more limiting that the electrical properties for this design. As best seen in FIG. 6C, a thickness of the portion of the rack insulator 720 that wraps around the transverse frame member 714 may be about 0.5 cm (e.g., +/−0.1 cm) to ensure that the transverse frame member 714 is isolated from contact with both the oven interface portion 702 and the cantilevered portion 704 of the rack support 700. In some cases, the rack insulator 720 may also be formed to include a support surface 722 formed to extend substantially parallel to the cantilevered portion 704 of the rack support 700 so that the rack 710 can sit flat and evenly on the cantilevered portion 704 of the rack support 700 when the rack 710 is inserted into the oven 100. In some cases, an instance of the support surface 722 may be duplicated on top and bottom sides of the rack 710 so that the rack 710 may essentially be interchangeably inverted without any change to the function of the rack insulator 720.

In an example embodiment, in order to facilitate installation of the rack insulator 720 on existing racks, the rack insulator 720 could be fabricated as a two piece assembly that is configured to receive a standard sized rack. As such, for example, for every instance of the rack 710 where specific configuration details are known, a corresponding instance of the rack insulator 720 with matching dimensions may be fabricated as a two piece structure that can be easily assembled over opposing longitudinal ends of the rack 710 (i.e., the ends that interface with the rack support 700).

Figure 7A:
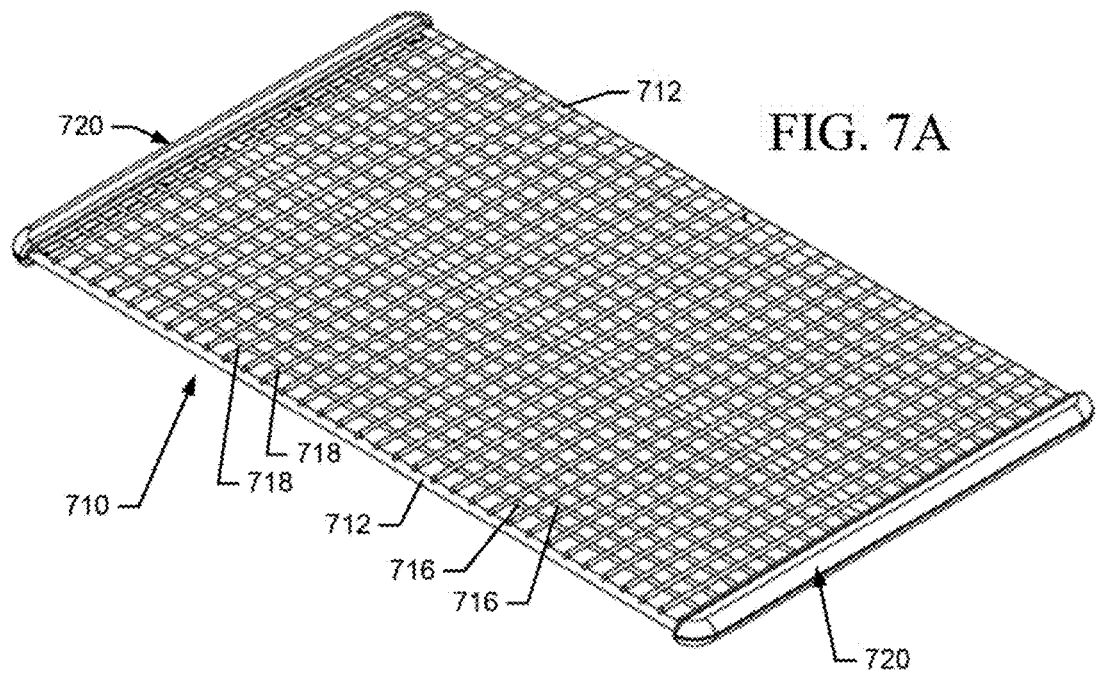
Figure 7B:
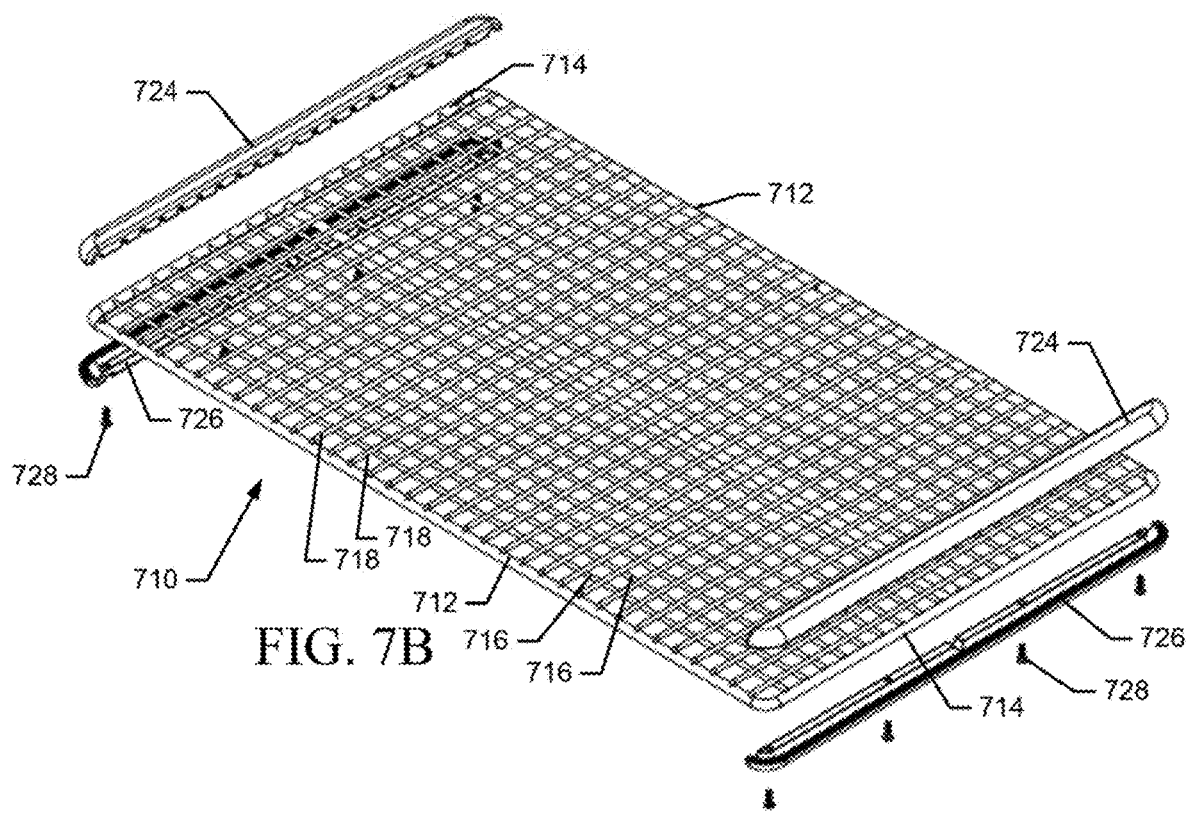
Figure 7C:
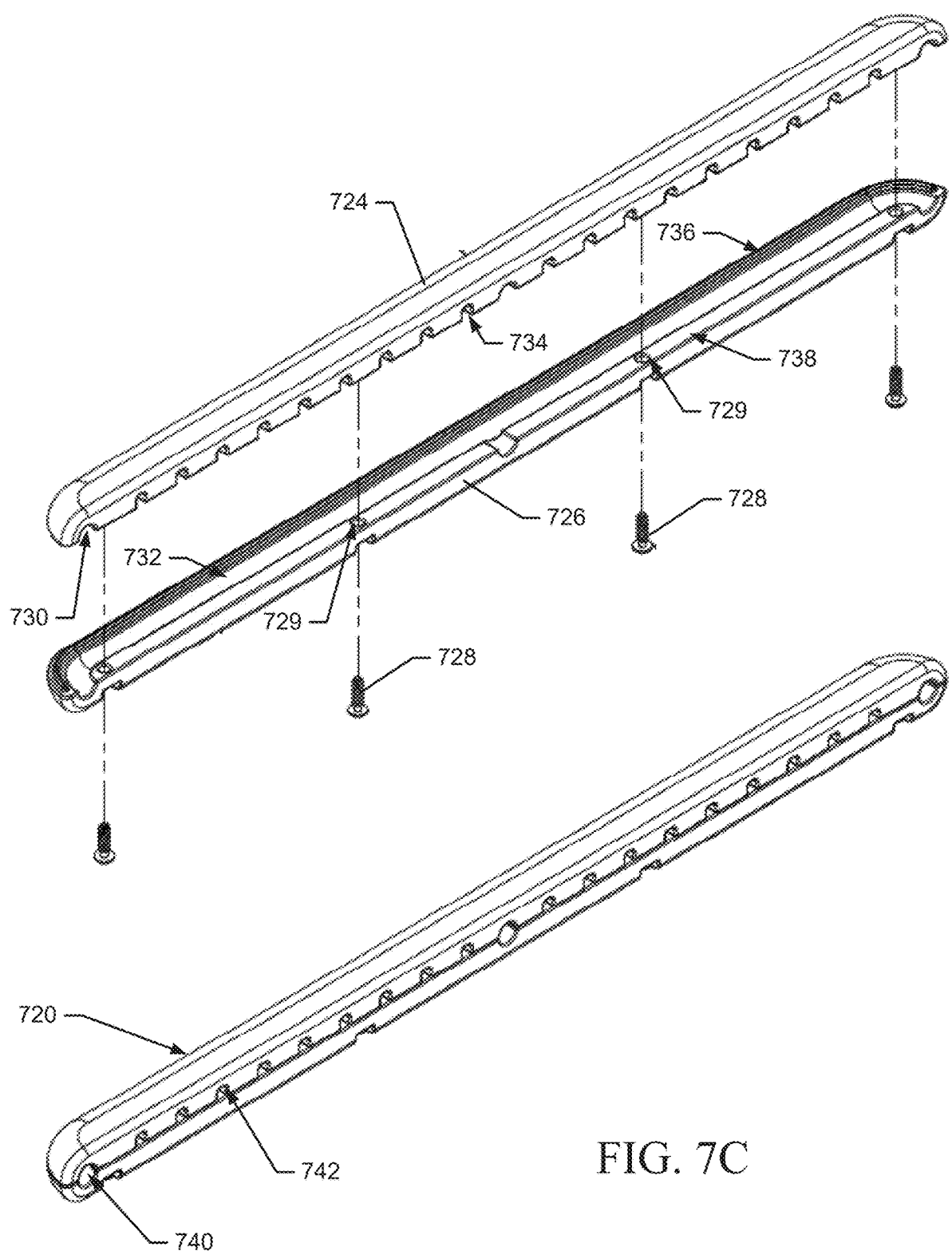
Figure 7D:
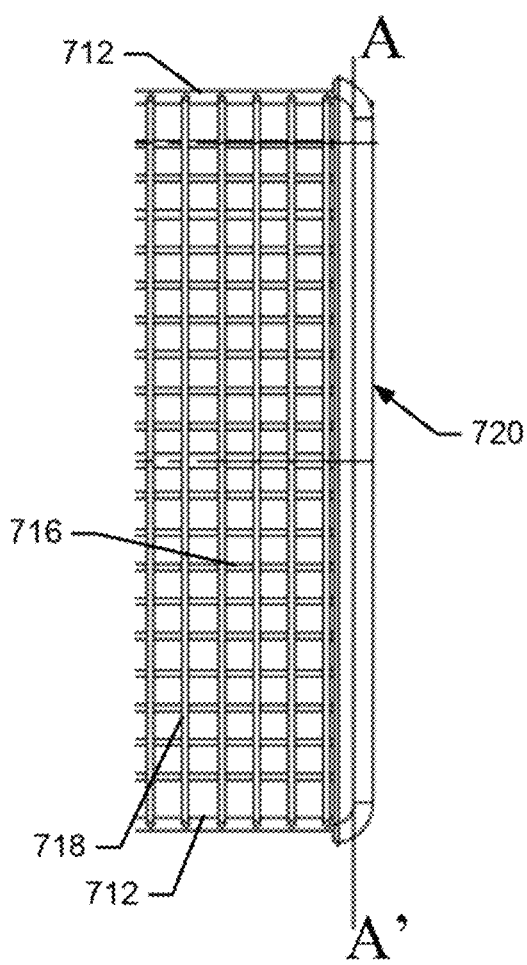
Figure 7E:
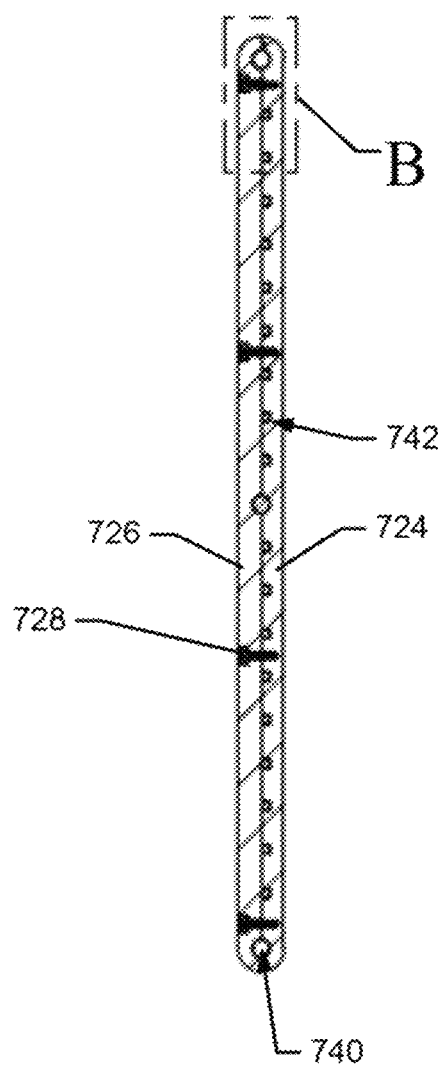
Figure 7F:
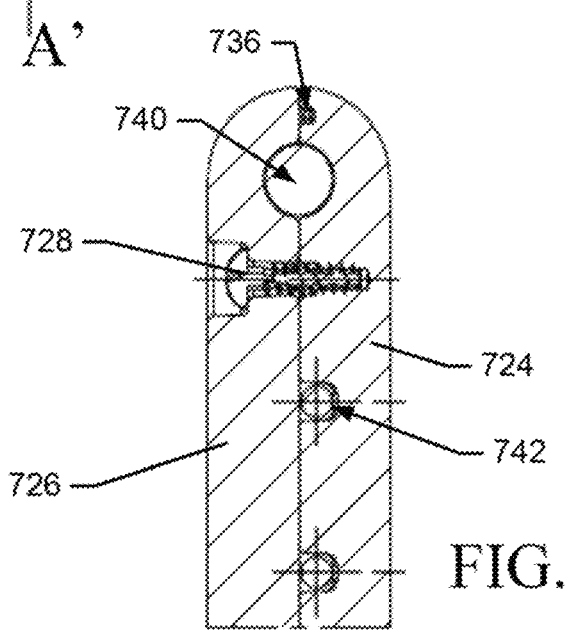

FIG. 7, which is defined by FIGS. 7A, 7B, 7C, 7D, 7E and 7F, shows various aspects of the two piece structure of one example embodiment of the rack insulator 720. In this regard, FIG. 7A illustrates a perspective view of the rack 710 and rack insulator 720 fully assembled, while FIG. 7B illustrates an exploded perspective view of the rack 710 and rack insulator 720. FIG. 7C illustrates the rack insulator 720 in both exploded and assembled contexts. FIG. 7D illustrates a top view of the rack insulator 720, and FIG. 7E illustrates a cross section view of the rack insulator 720 taken through line A-A' in FIG. 7D. FIG. 7F is a closeup view of the area B in FIG. 7E.

Referring to FIGS. 7A-7E, the two piece structure of the rack insulator 720 includes a first body portion 724 and a second body portion 726. The first and second body portions 724 and 726 may be molded to include various channels that are configured to receive the transverse frame member 714 on each respective end of the rack 710 along with the longitudinal ends of the longitudinal mesh rods 716. The first and second body portions 724 may also include joining channels 729 that align to permit screws 728 or other fasteners to be passed therethrough to join or otherwise affix the first and second body portions 724 together.

Referring specifically to FIG. 7C, the channels mentioned above for receiving the transverse frame member 714 on each respective end of the rack 710 along with the longitudinal ends of the longitudinal mesh rods 716 are shown in greater detail. In this regard, first body portion 724 includes a first frame reception slot 730 that substantially mirrors a second frame reception slot 732 formed in the second body portion 726. Each of the first and second reception slots 730 and 732 may extend substantially parallel to the longitudinal length of the first and second body portions 724 and 726, respectively. However, at opposing ends of the first and second body portions 724 and 726, the first and second reception slots 730 may transition through about a 90 degree bend to accommodate at least a portion of the longitudinal frame members 712 on each opposing side as well. Accordingly, about 0.5 cm of PEEK or other insulating material may also extend forward and rearward of the rack 710 to prevent metal to metal contact between the rack 710 and either the door 104 or the choke 140, the back wall of the cooking chamber 102 or any portions thereof. As such, the rack 710 may be inserted into the cooking chamber 102 in any way that allows closing of the door 104, and the operator can be assured that the arcing protection sought will not be compromised by the insertion.

When the first and second body portions 724 and 726 are joined together, a frame channel 740 is formed that substantially encloses the transverse frame member 714 (and end portions of the longitudinal frame members 712). In an example embodiment, a tongue-and-groove assembly 736 (with the tongue portion on either one of the first or second body portion 724 or 726 and the groove portion formed on the other of the second or first body portion 726 or 724) may be formed to ensure proper alignment of the first and second body portions 724 and 726 prior to affixing via the screws 728. The tongue-and-groove assembly 736 may or may not extend over the full length of the first and second body portions 724 and 726 in various example embodiments.

In an example embodiment, the longitudinal mesh rods 716 may be located entirely above a plane that passes through a center of the rack insulator 720. Thus, for example, mesh rod reception slots 734 formed in the first body portion 724, which are configured to partially enclose the ends of the longitudinal mesh rods 716 may meet a rod support surface 738 of the second body portion 726 to form mesh rod channels 742. The mesh rod channels 742 may be spaced apart from each other by a distance equal to the spacing between longitudinal mesh rods 716. Accordingly, when the second body portion 726 is placed below the rack 710 such that the transverse frame member 714 is located in the second frame reception slot 732, the first body portion 724 can be placed above the rack 710 to align the tongue-and-groove assembly 736. The top portion of the transverse frame member 714 will then be received in the first frame reception slot 730, and the longitudinal mesh rods 716 will be received in the mesh rod reception slots 734. The screws 728 may then be secured in the joining channels to form the frame channel 740 and the mesh rod channels 724 insulating the transverse frame member 714 and the ends of the longitudinal mesh rods 716, respectively. As noted above, the support surface 722 may be enabled to lie flat on the cantilevered portion 704 of the rack support 700 while all metallic portions of the rack 710 that are proximate to portions of the rack support 700 have at least a minimum thickness of about 0.5 cm of PEEK or similar insulating material therebetween.

As such, for example, a thickness of each of the first and second body portions 724 and 726 may be about 0.75 cm such that a thickness of the rack insulator 720 (as measured in a direction away from the cantilevered portion 704 of the rack support 700 from support surface 722 to support surface 722) may be about 1.5 cm. The length of the support surfaces 722 may each be about 1 cm in some embodiments. However, other distances may be employed based on the gauge of wire or rods used to form the rack 710. In any case, the isolation of the rack 710 from the rack support 700 (and any walls of the cooking chamber 102) may inhibit arcing from occurring due to non-continuous contact between metallic parts in the cooking chamber 102. For example, the rack 710 may warp or bend over time due to heavy or frequent usage, and the warping/bending may cause areas of non-continuous contact if not otherwise dealt with. Providing structures to act as a further inhibitor to the occurrence of arcing may, in connection with the electronic sensing and arcing prevention methods, provide a very high reliability for the electronic components of the oven 100. However, the inclusion of the rack insulator 720 may provide for a further safety margin from the occurrence of energy buildup that might otherwise cause arcing in the first place so that uninterrupted operation of the oven 100 (and its electronics) can continue without losses in efficiency.

The example of FIGS. 6 and 7 illustrates an example embodiment in which the rack interface insulating assembly places electrical insulating material between the rack 710 and rack support 700 on the rack 710 in the form of the rack insulator 720. It should be appreciated that an alternative design may place insulating material on the rack support instead. FIGS. 8 and 9 illustrate such an example.

Figure 8A:
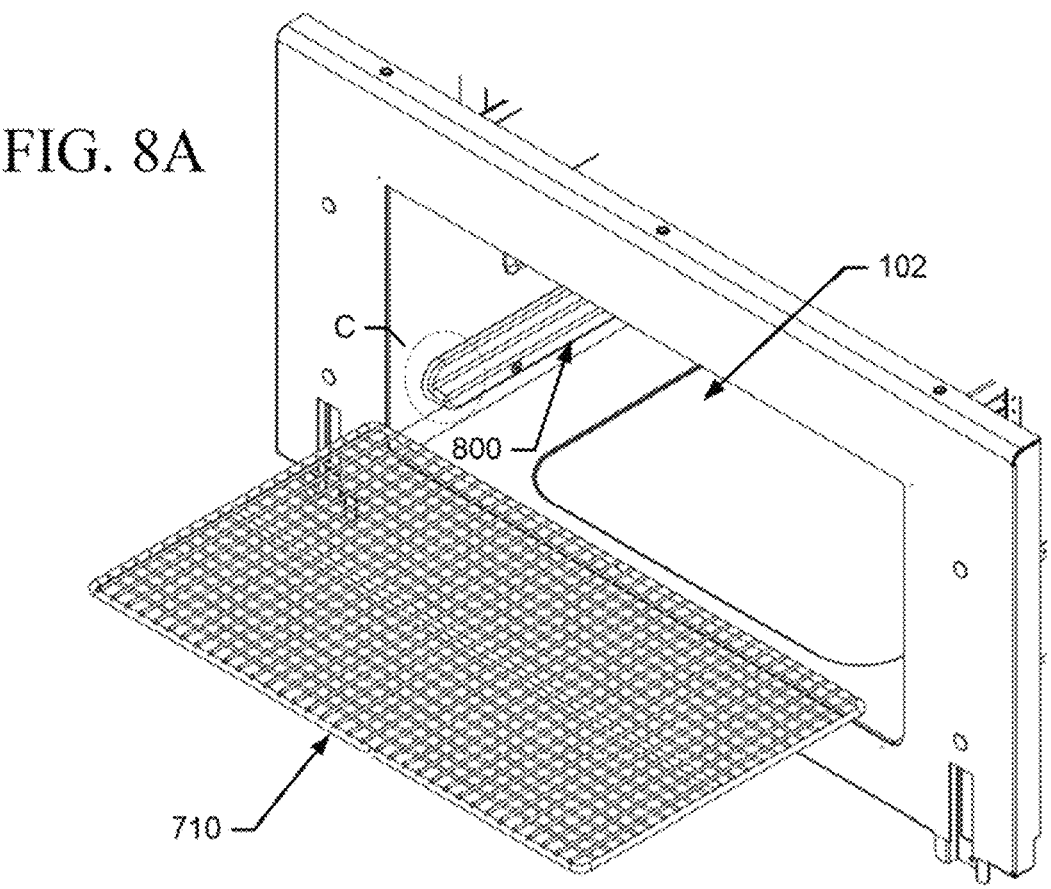
Figure 8B:
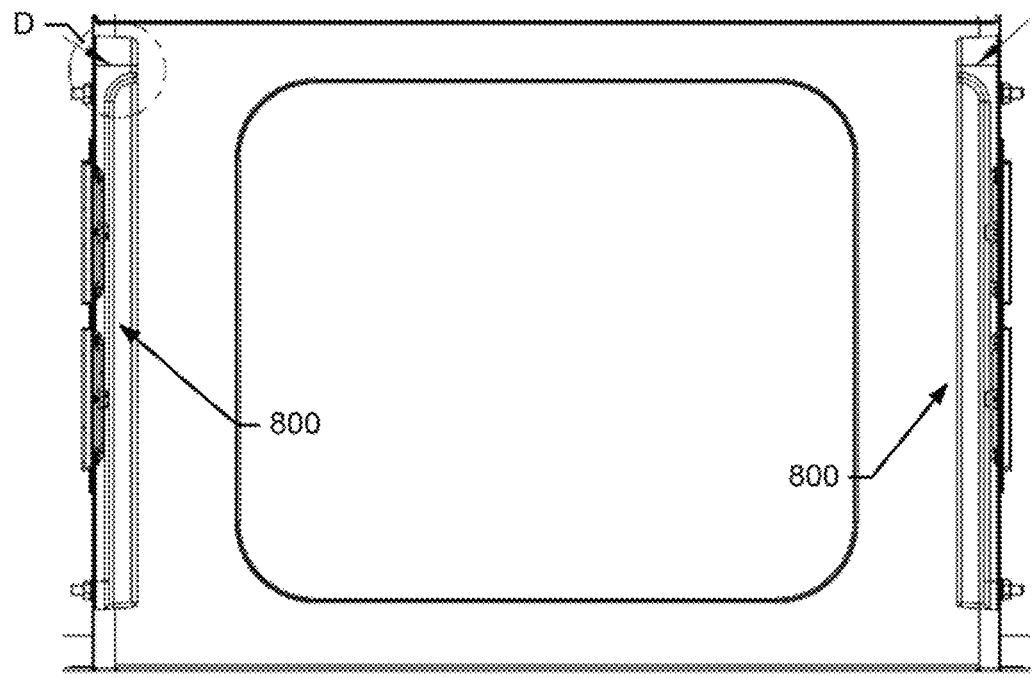
Figure 8C:
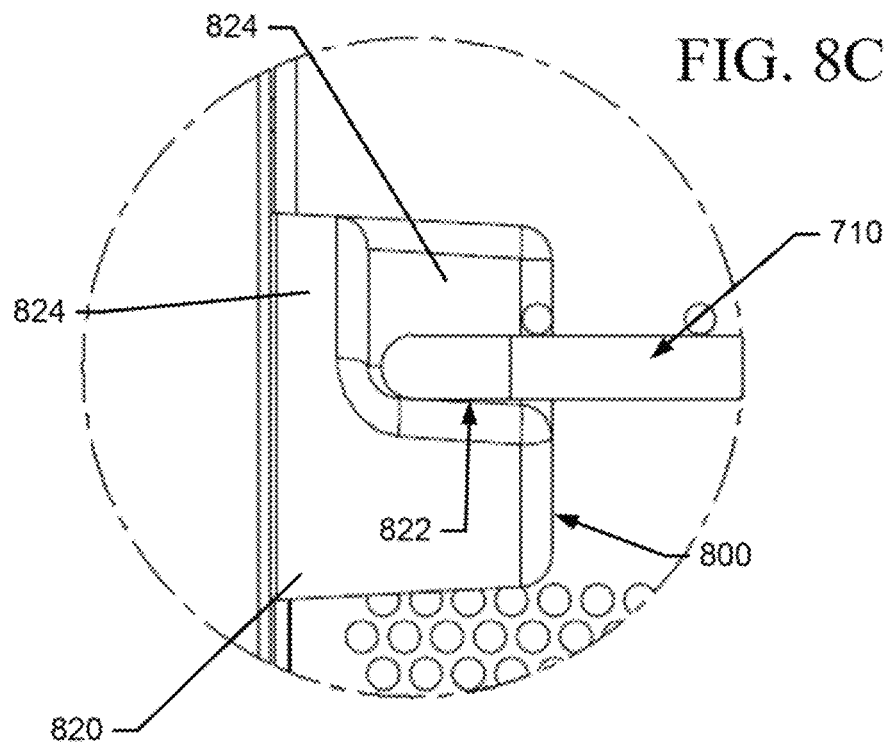
Figure 8D:
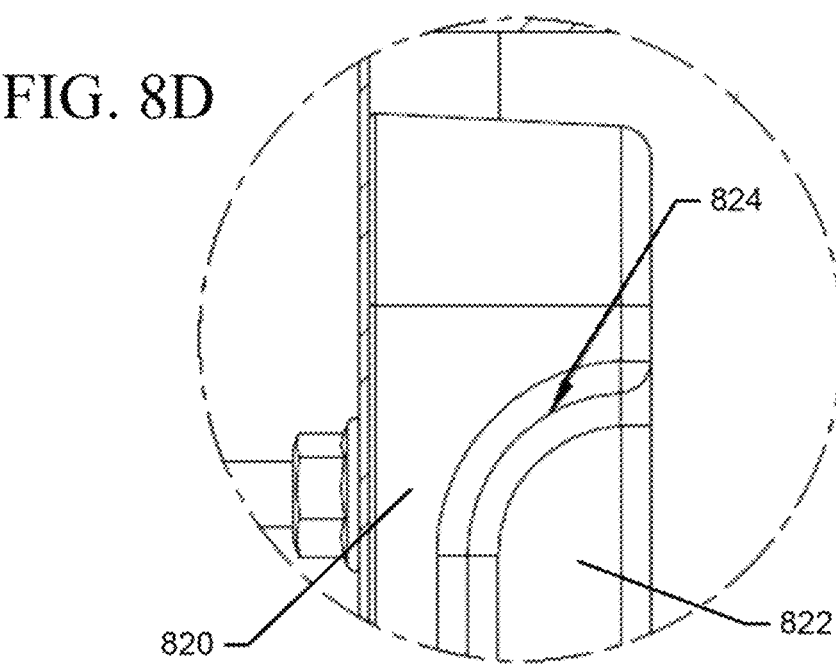

In this regard, FIG. 8 which is defined by FIGS. 8A, 8B, 8C and 8D illustrates various views of an insulated rack support 800 located within the oven 100 in accordance with an example embodiment. In this regard, FIG. 8A illustrates a perspective view of the insulated rack support 800 and the rack 710 of FIGS. 6 and 7 without the rack insulator 720, and FIG. 8B showing a top view of the same. Thus, any conventional rack could be used, and the insulated rack support 800 could provide the isolation described above. FIG. 8C illustrates a close-up view of region C from FIG. 8A and FIG. 8D illustrates a close-up view of region D from FIG. 8B. FIG. 9, which is defined by FIGS. 9A, 9B and 9C shows various views of the insulated rack support 800 in isolation. FIG. 9A illustrates a perspective view of a mounting bracket 810 of the insulated rack support 800, and FIG. 9B illustrates a perspective view of a rack support body 820 of the insulated rack support 800. FIG. C illustrates an exploded perspective view of the insulated rack support 800 to show how the rack support body 820 and the mounting bracket 810 fit together in accordance with an example embodiment.

Referring now to FIGS. 8 and 9, the mounting bracket 810 may include an oven interface portion 812 and a cantilevered portion 814. Similar to the discussion above, a pair of insulated rack supports 800 may be affixed (e.g., via screws or other fastening means) to opposite sidewalls on the inside of the cooking chamber 102 at a same height. In particular, the cantilevered portions 814 of each instance of the mounting bracket 810 may be at a single and common height within the cooking chamber 102.

The oven interface portion 812 and the cantilevered portion 814 may each be metallic and may be formed from the same sheet of metal (e.g., bent at a 90 degree angle at the interface between the oven interface portion 812 and the cantilevered portion 814). As in the example discussed above, the oven interface portion 812 and the cantilevered portion 814 may each have approximately the same transverse and longitudinal lengths. However, different lengths could also be employed. In an example embodiment, the longitudinal lengths of each of the oven interface portion 812 and the cantilevered portion 814 may be about the same as the transverse length of each respective end of the rack 710. For example, if the rack 710 is defined as a wire mesh having a transverse length of about 32.5 cm and a longitudinal length of about 55 cm, then the longitudinal lengths of the oven interface portion 812 and the cantilevered portion 814 may each be about 32.5 cm. However, in some cases the longitudinal lengths of the oven interface portion 812 and the cantilevered portion 814 could be larger than the transverse length of the rack 710 to provide suitable support for the rack 710. In some cases, the transverse lengths of each of the oven interface portion 812 and the cantilevered portion 814 may fall in a range of about 1 cm to about 3 cm.

As can be appreciated best from FIG. 9C, the mounting bracket 810 may also include a mounting plate 816 to which the rack support body 820 may be affixed. In this regard, the mounting plate 816 may extend substantially perpendicularly away from a lateral side of the cantilevered portion 814 that is opposite the lateral side of the cantilevered portion 814 that attaches to the oven interface portion 812. As such, the mounting plate 816 may extend substantially parallel to the oven interface portion 812. The mounting plate 816 may include fastener receivers 818 that are configured to receive a threaded fastener 819 or other such fastening device to attach the rack support body 820 to the mounting bracket 810.

In order to provide adequate insulation between metallic components of the rack 710 and the metallic portions of the mounting bracket 810, the rack support body 820 may be formed to be positioned between any metallic part of the rack 710 and the mounting bracket 810 that would otherwise have potential for contact upon insertion of the rack 710 into the cooking chamber 102. Thus, for example, the rack support body 820 may be formed to cover the oven interface portion 812, the cantilevered portion 814, and the mounting plate 816 while being secured to the mounting plate 816. The rack support body 820 may be configured to fit over the mounting bracket 810 and define an interface with the sidewall of the cooking chamber 102 that substantially encloses the outer shape of the oven interface portion 812 of the mounting bracket 810.

In an example embodiment, the rack support body 820 may be formed of material that has good dielectric properties, and maintains such properties at high temperatures. Thus, for example, the rack support body 820 may be formed of a dielectric material that does not suffer any degradation at temperatures up to about 275° C. In an example embodiment, the rack support body 820 may be formed of PEEK. The thickness of the rack support body 820 may be chosen based on consideration of both mechanical and electrical performance. In this regard, the thickness of the rack support body 820 should be sufficient to prevent arcing with the power levels and frequencies employed, and must also be thick enough to provide sufficient robustness to withstand the mechanical stresses associated with sliding the rack 710 into the cooking chamber 102 repeatedly and placing potentially heavy food products onto the rack 710 with the corresponding mechanical shocks associated therewith.

As such, for example, a thickness of the rack support body 820 may be at least about 0.75 cm. The rack support body 820 may further include an insulated support surface 822 that extends away from a sidewall spacer portion 824. The insulated support surface 822 may lie in a plane with the corresponding insulated support surface 822 disposed at the opposite sidewall of the cooking chamber 102 and define a platform on which the rack 710 can be supported and/or slid. Meanwhile, the sidewall spacer portion 824 may extend outwardly from the sidewall of the cooking chamber 102 by a distance slightly less than one half the difference in length between the length of the rack 710 and the distance between opposing sidewalls of the cooking chamber 102. In an example embodiment, the sidewall spacer portion 824 may extend away from the sidewall of the cooking chamber 102 by about 1.1 cm, and the width of the insulated support surface 822 (measured from an interface with the sidewall spacer portion 824 to a distal, lateral edge of the insulated support surface 822) may be about 1.5 cm. A height of the insulated support surface 822 (measured from a bottom of the rack support body 820 may be about 1.8 cm. Meanwhile, the length of the sidewall spacer portion 824 that extends upwardly from the insulated support surface 822 may also be about 1.8 cm in some embodiments.

As shown in FIG. 8C, the sidewall spacer portion 824 and the insulated support surface 822 may combine to form an L shape when viewed from the front of the oven 100. Meanwhile, the insulated support surface 822 may terminate at a bumper portion 826 formed at a distal end of the rack support body 820 relative to the door 104 of the oven 100. The bumper portion 826 may be formed to fit a curvature of the rack 710 (if applicable), but otherwise may form a surface to prevent further insertion of the rack 710 into the cooking chamber 102. Thus, for example, the rack 710 may be placed on a portion of the insulated support surface 822 that is closest to the door 104, and may be slid rearward along the insulated support surface 822 until the rack 710 contacts the bumper portion 826. In an example embodiment, the length of the insulated support surface 822 may be about equal to the transverse length of the rack 710 (e.g., about 32 cm in this example).

As can be appreciated from FIGS. 8 and 9, the isolation of the rack 710 from the mounting bracket 810 (and any walls of the cooking chamber 102) may inhibit arcing from occurring due to non-continuous contact between metallic parts in the cooking chamber 102. This further inhibitor to the occurrence of arcing may, in connection with the electronic sensing and arcing prevention methods, provide a very high reliability for the electronic components of the oven 100. However, the inclusion of the rack support body 820 may provide for a further safety margin from the occurrence of energy buildup that might otherwise cause arcing in the first place so that uninterrupted operation of the oven 100 (and its electronics) can continue without losses in efficiency.

It should also be appreciated that while either the rack support body 820 of FIGS. 8 and 9 or the rack insulator 720 of FIGS. 6 and 7 could be used alone to inhibit arcing. Both the rack support body 820 of FIGS. 8 and 9 and the rack insulator 720 of FIGS. 6 and 7 could, in some cases, be implemented together in combination with each other. In either case, the rack support body 820 of FIGS. 8 and 9 or the rack insulator 720 of FIGS. 6 and 7 may act as a rack interface insulating assembly that places electrical insulating material between the rack 710 and any metallic components that support the rack 710 within the cooking chamber 102.

In an example embodiment, an oven may be provided. The oven may include a cooking chamber configured to receive a food product, at least a pair of rack supports disposed at opposing sidewalls of the cooking chamber, a rack configured to support the food product responsive to placement of the rack on the rack supports, a rack interface insulating assembly comprising insulating material providing a dielectric barrier between the rack and the rack supports, and a radio frequency (RF) heating system configured to provide RF energy into the cooking chamber using solid state electronic components to heat the food product. The solid state electronic components may include power amplifier electronics and control electronics configured to control operation of the power amplifier electronics.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the rack interface insulating assembly may include a rack insulator. The rack may include a wire frame, and the rack insulator substantially encloses at least a portion of the wire frame that is proximate to a corresponding one of the rack supports responsive to insertion of the rack into the cooking chamber. In an example embodiment, the rack may include a wire mesh including longitudinal mesh rods and transverse mesh rods that extend between the wire frame substantially perpendicular to each other. In some cases, the rack insulator substantially further encloses an end portion of the longitudinal mesh rods. In an example embodiment, the rack insulator may include a first body portion and a second body portion. The first and second body portions may each include joining channels that align to enable a fastener to be passed therethrough to join the first and second body portions together. In some cases, a tongue-and-groove assembly may be disposed on the first or second body portions to provide alignment of the joining channels when the first and second body portions are joined together. In an example embodiment, the first body portion may include a first frame reception slot that substantially mirrors a second frame reception slot formed in the second body portion, and each of the first and second reception slots may extend substantially parallel to a longitudinal length of the first and second body portions, respectively. In some cases, the first and second reception slots may bend about 90 degrees at opposing ends of the first and second body portions, respectively. In an example embodiment, rod reception slots may be formed in the first body portion. The rod reception slots may be configured to partially enclose ends of the longitudinal mesh rods and the rod reception slots may meet a rod support surface of the second body portion to form mesh rod channels. In some cases, the rack interface insulating assembly may include an insulated rack support. The insulated rack support may include a rack support body, which includes the insulating material, and a metallic mounting bracket that mounts to one of the sidewalls of the cooking chamber. In an example embodiment, the mounting bracket may include an oven interface portion that is mounted to the one of the sidewalls of the cooking chamber and a cantilevered portion that extends substantially perpendicularly away from the oven interface portion. The mounting bracket may further include a mounting plate that extends substantially perpendicularly away from a distal end of the cantilevered portion relative to the oven interface portion. The rack support body may be attached to the mounting bracket via the mounting plate. In some cases, the rack support body may include a sidewall spacer portion and an insulated support surface that extends away from the sidewall spacer portion to define a platform on which the rack is enabled to be supported or slid. In an example embodiment, the sidewall spacer portion extends outwardly from one of the sidewalls of the cooking chamber, and the insulated support surface extends substantially perpendicularly away from the sidewall spacer portion to define an L shape. In some cases, the insulated support surface terminates at a bumper portion formed at a distal end of the rack support body relative to a door of the oven. In an example embodiment, the bumper portion may be formed to include a shape configured to match a curvature of a corner portion of the rack. In some cases, the insulating material may be PEEK, and a thickness of the insulating material may be at least about 0.5 cm +/−0.1 cm.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
    a cooking chamber configured to receive a food product;
    at least a pair of rack supports disposed at opposing sidewalls of the cooking chamber;
    a rack configured to support the food product responsive to placement of the rack on the rack supports;
    a rack interface insulating assembly comprising an insulating material providing a dielectric barrier between the rack and the rack supports; and a radio frequency (RF) heating system configured to provide RF energy into the cooking chamber using solid state electronic components to heat the food product, wherein the solid state electronic components include power amplifier electronics and control electronics configured to control operation of the power amplifier electronics.

2. The oven of claim 1, wherein the rack interface insulating assembly comprises a rack insulator, wherein the rack comprises a wire frame, and wherein the rack insulator substantially encloses at least a portion of the wire frame that is proximate to a corresponding one of the rack supports responsive to insertion of the rack into the cooking chamber.

3. The oven of claim 2, wherein the rack comprises a wire mesh including longitudinal mesh rods and transverse mesh rods that extend between the wire frame substantially perpendicular to each other.

4. The oven of claim 3, wherein the rack insulator substantially further encloses an end portion of the longitudinal mesh rods.

5. The oven of claim 3, wherein rod reception slots are formed in a first body portion of the rack insulator, the rod reception slots being configured to partially enclose ends of the longitudinal mesh rods, wherein the rod reception slots meet a rod support surface of a second body portion of the rack insulator to form mesh rod channels.

6. The oven of claim 2, wherein the rack insulator comprises a first body portion and a second body portion, the first and second body portions each including joining channels that align to enable a fastener to be passed therethrough to join the first and second body portions together.

7. The oven of claim 6, wherein a tongue-and-groove assembly is disposed on the first or second body portions to provide alignment of the joining channels when the first and second body portions are joined together.

8. The oven of claim 6, wherein the first body portion includes a first frame reception slot that substantially mirrors a second frame reception slot formed in the second body portion, and wherein each of the first and second reception slots extends substantially parallel to a longitudinal length of the first and second body portions, respectively.

9. The oven of claim 8, wherein the first and second reception slots bend about 90 degrees at opposing ends of the first and second body portions, respectively.

10. The oven of claim 1, wherein the rack interface insulating assembly comprises an insulated rack support, the insulated rack support comprising a rack support body, which includes the insulating material, and a metallic mounting bracket that mounts to one of the sidewalls of the cooking chamber.

11. The oven of claim 10, wherein the mounting bracket comprises an oven interface portion that is mounted to the one of the sidewalls of the cooking chamber and a cantilevered portion that extends substantially perpendicularly away from the oven interface portion, wherein the mounting bracket further comprises a mounting plate that extends substantially perpendicularly away from a distal end of the cantilevered portion relative to the oven interface portion, and wherein the rack support body is attached to the mounting bracket via the mounting plate.

12. The oven of claim 10, wherein the rack support body comprises a sidewall spacer portion and an insulated support surface that extends away from the sidewall spacer portion to define a platform on which the rack is enabled to be supported or slid.

13. The oven of claim 12, wherein the sidewall spacer portion extends outwardly from one of the sidewalls of the cooking chamber, and the insulated support surface extends substantially perpendicularly away from the sidewall spacer portion to define an L shape.

14. The oven of claim 13, wherein the insulated support surface terminates at a bumper portion formed at a distal end of the rack support body relative to a door of the oven.

15. The oven of claim 14, wherein the bumper portion is formed to include a shape configured to match a curvature of a corner portion of the rack.

16. The oven of claim 1, wherein the insulating material comprises Polyether ether ketone (PEEK).

17. The oven of claim 1, wherein a thickness of the insulating material is at least about 0.5 cm +/−0.1 cm.

18. A rack insulator for an oven, the rack insulator comprising an insulating material and being configured to substantially enclose at least a portion of a wire frame or a rack of the oven that is proximate to a corresponding rack support that supports the rack in the oven responsive to insertion of the rack into the oven, the rack insulator comprising:

a first body portion; and a second body portion, wherein the first body portion includes a first frame reception slot that substantially mirrors a second frame reception slot formed in the second body portion, and wherein each of the first and second reception slots extends substantially parallel to a longitudinal length of the first and second body portions, respectively.

19. The rack insulator of claim 18, wherein the first and second reception slots bend about 90 degrees at opposing ends of the first and second body portions, respectively.

* * * * *